US008887481B2

(12) United States Patent
Ehrsam et al.

(10) Patent No.: US 8,887,481 B2
(45) Date of Patent: Nov. 18, 2014

(54) METHOD FOR STARTING A COMBINED CYCLE POWER PLANT

(75) Inventors: Andreas Ehrsam, Baden (CH); Thomas Schreier, Neuenhof (CH)

(73) Assignee: Alstom Technology Ltd, Baden (CH)

( * ) Notice: Subject to any disclaimer, the term of this patent is extended or adjusted under 35 U.S.C. 154(b) by 848 days.

(21) Appl. No.: 12/964,982

(22) Filed: Dec. 10, 2010

(65) Prior Publication Data

US 2012/0144839 A1     Jun. 14, 2012

(51) Int. Cl.
F02C 6/00      (2006.01)
F02G 1/00      (2006.01)
F02G 3/00      (2006.01)
F01D 19/02     (2006.01)
F02C 7/26      (2006.01)

(52) U.S. Cl.
CPC .......... F01D 19/02 (2013.01); F05D 2270/303 (2013.01); F02C 7/26 (2013.01)
USPC .............................. 60/39.182; 60/670; 60/773

(58) Field of Classification Search
USPC ............. 60/39.182, 670, 39.5, 39.511, 39.52, 60/784, 783, 773, 778; 122/7 R, 7 B
See application file for complete search history.

(56) References Cited

U.S. PATENT DOCUMENTS

| | | | | |
|---|---|---|---|---|
| 3,879,616 A * | 4/1975 | Baker et al. | ................. | 290/40 R |
| 4,031,404 A * | 6/1977 | Martz et al. | ................. | 290/40 R |
| 4,081,956 A * | 4/1978 | Baker et al. | ................. | 60/39.182 |
| 4,282,708 A * | 8/1981 | Kuribayashi et al. | ........... | 60/778 |
| 4,519,207 A * | 5/1985 | Okabe et al. | ................. | 60/39.182 |
| 5,044,152 A * | 9/1991 | Hoizumi et al. | ................. | 60/773 |
| RE36,524 E * | 1/2000 | Tomlinson | ..................... | 60/783 |
| 6,178,734 B1 * | 1/2001 | Shibuya et al. | ................. | 60/772 |
| 6,205,762 B1 * | 3/2001 | Uematsu et al. | ................. | 60/775 |
| 6,220,014 B1 * | 4/2001 | Wada et al. | ..................... | 60/778 |
| 6,338,241 B1 * | 1/2002 | Shibuya et al. | ............ | 60/39.182 |
| 6,422,022 B2 * | 7/2002 | Gorman et al. | ................. | 60/771 |
| 6,829,898 B2 * | 12/2004 | Sugishita | ........................ | 60/772 |
| 7,621,133 B2 * | 11/2009 | Tomlinson et al. | ............. | 60/778 |

* cited by examiner

Primary Examiner — William H Rodriguez
(74) Attorney, Agent, or Firm — Buchanan Ingersoll & Rooney PC

(57) ABSTRACT

A method for starting a combined cycle power plant (1) includes loading the gas turbine unit (2), providing a starting temperature ($T_{start}$) for the steam supplied to the steam turbine (5), while the control valve (7) is regulated controlling the temperature of the steam at a temperature substantially equal to the starting temperature ($T_{start}$) at a position ($P_2$) downstream of the control valve (7) and upstream of the rotor (8), when the control valve (7) is substantially fully open, supplying steam to the steam turbine (5) at the starting temperature ($T_{start}$). The steam temperature is controlled by controlling the steam temperature upstream of the control valve (7) in accordance with the temperature drop caused by the control valve (7) when the steam passes through it.

8 Claims, 5 Drawing Sheets

METHOD FOR STARTING A COMBINED CYCLE POWER PLANT

BACKGROUND

1. Field of Endeavor

The present invention relates to a method for starting a combined cycle power plant.

2. Brief Description of the Related Art

With reference to FIG. 1, a combined cycle power plant 1 includes a gas turbine unit 2 and a steam turbine unit 3 (water heater steam cycle including HRSG and steam turbine).

In particular the steam turbine unit 3 has a heat recovery steam generator (HRSG) 4 into which the flue gases, discharged from the gas turbine unit 2, are fed.

In the heat recovery steam generator (HRSG) 4, steam is generated that is then fed into the steam turbine 5.

The steam turbine 5 includes a stop valve 6 (this is an on/off valve), a control valve 7 (they can also be made in one single element or the stop valve 6 can be upstream of the control valve 7), a rotor 8 and guide vanes 9.

In addition, attemperators 10 are provided within the heat recovery steam generator 4 and/or between the heat recovery steam generator 4 and the steam turbine 5, to control the temperature of the steam that comes from the heat recovery steam generator (HRSG) 4 and is supplied into the steam turbine 5.

In order to start a combined cycle plant 1 like the one described, U.S. Pat. No. 7,621,133 discloses a method that includes:
- loading the gas turbine unit 1 at its maximum rate,
- supplying steam to the steam turbine 5 at a prefixed constant temperature from the initial steam admission until all the steam is admixed into the steam turbine 5.

In other words, when the combined cycle plant 1 is started, and after the gas turbine unit 2 is loaded, the steam attemperators 10 are regulated such that the steam at a position $P_1$ upstream of the steam turbine 5 (i.e., downstream of the reheat boiler 4 and upstream of the control valve 7) has a substantially constant prefixed temperature.

Nevertheless, when the steam turbine unit 3 is started, the control valve 7 is regulated from a closed position to a fully open position; during this regulation the steam, when passing through the control valve 7, cools because of: the so called Joule-Thompson effect or throttling effect; it causes steam cooling without heat exchange between the steam and control valve 7; and heat exchange between the steam and control valve 7.

Therefore during the control valve 7 regulation, the steam temperature at a position $P_2$ downstream of the control valve 7 and upstream of the rotor 8 is lower than the prefixed temperature.

With reference to FIG. 2, the steam temperature $T_s$ run during a traditional starting is shown (t indicates the time from initial steam admission into the steam turbine 5, i.e., from when the control valve 7 opening starts).

In this figure solid line 15 indicates the steam temperature at the position $P_1$ and dashed line 16 indicates the steam temperature at the position $P_2$.

It is clear that during the time interval 17 (i.e., when the control valve 7 is regulated), because of the already cited Joule-Thompson effect, the steam temperature at the position $P_2$ is generally lower than the temperature at the position $P_1$; in particular the temperature at the position $P_2$ increases from a minimum temperature until it is substantially equal to the temperature at the position $P_1$ (in this condition the control valve 7 is fully open, no cooling for Joule-Thompson effect occurs and the heat exchange between the steam and control valve 7 is typically low).

When the control valve 7 is fully open (i.e., from the end of time interval 17 onwards), the temperatures at the positions $P_1$ and $P_2$ are substantially the same.

The stress to which the rotor 8 is subjected during starting mainly depends on: heat transfer (i.e., steam mass flow and pressure); and steam temperature increase.

Since the temperature of the steam upstream of the rotor 8 (i.e., at the position $P_2$) increases at the beginning of the start up, the heating of the rotor and other thick walled components (such as the turbine casing) is not optimal and results in thermal stresses that limit the number of starting procedures that can be carried out or significantly longer start up times.

SUMMARY

One of numerous aspects of the present invention includes a method addressing the aforementioned problems of the known art.

Another aspect includes a method by which the life consumption due to thermal stress, to which the rotor and other thick walled components downstream of the control valve are subjected when the steam turbine unit is started up, is reduced.

Advantageously, in yet another aspect, a faster start up can be achieved, without exceeding the material limits.

BRIEF DESCRIPTION OF THE DRAWINGS

Further characteristics and advantages of the invention will be more apparent from the description of a preferred but non-exclusive embodiment of the method illustrated by way of non-limiting example in the accompanying drawings, in which.

DETAILED DESCRIPTION OF EXEMPLARY EMBODIMENTS

Figure 1:
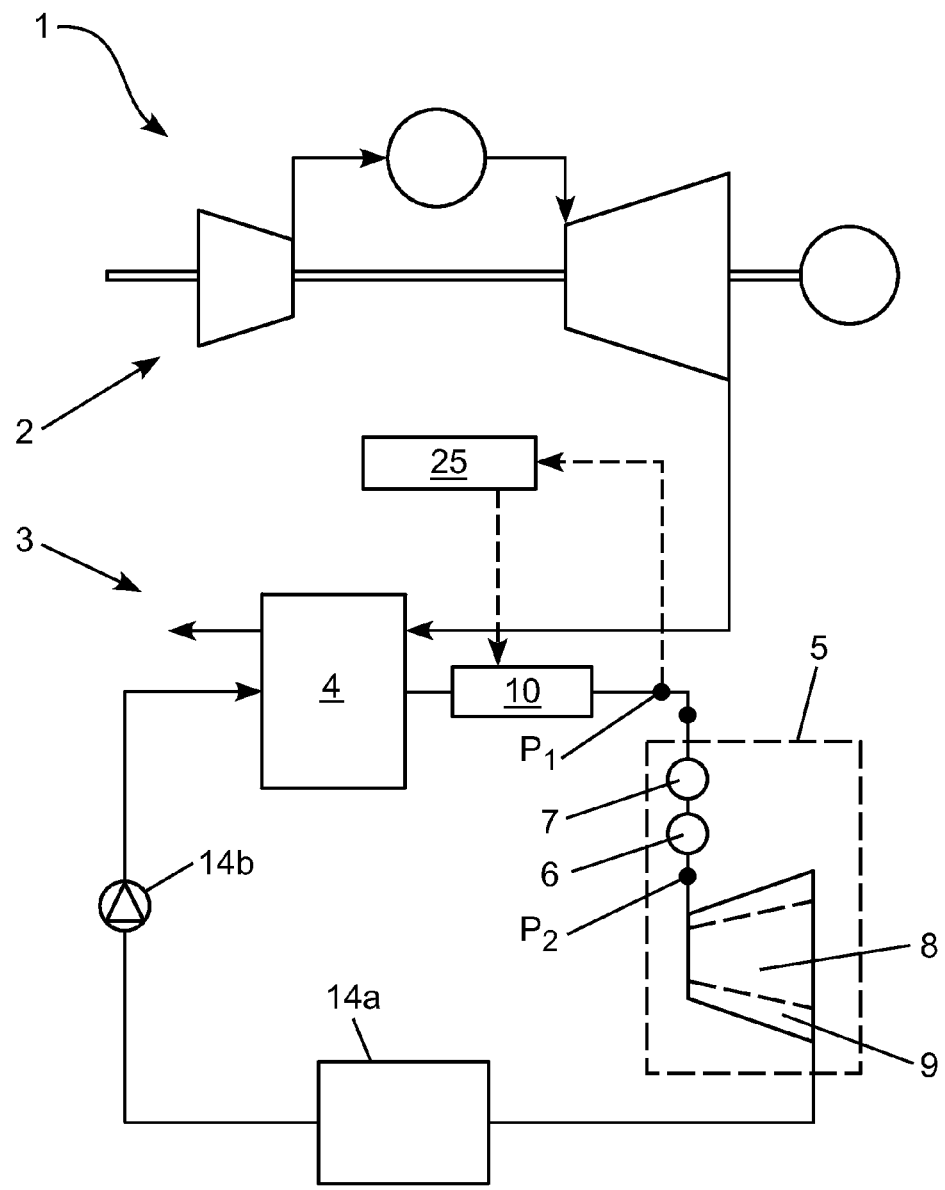
FIG. 1 is a schematic view of a combined cycle plant according to a known implementation.
Figure 2:
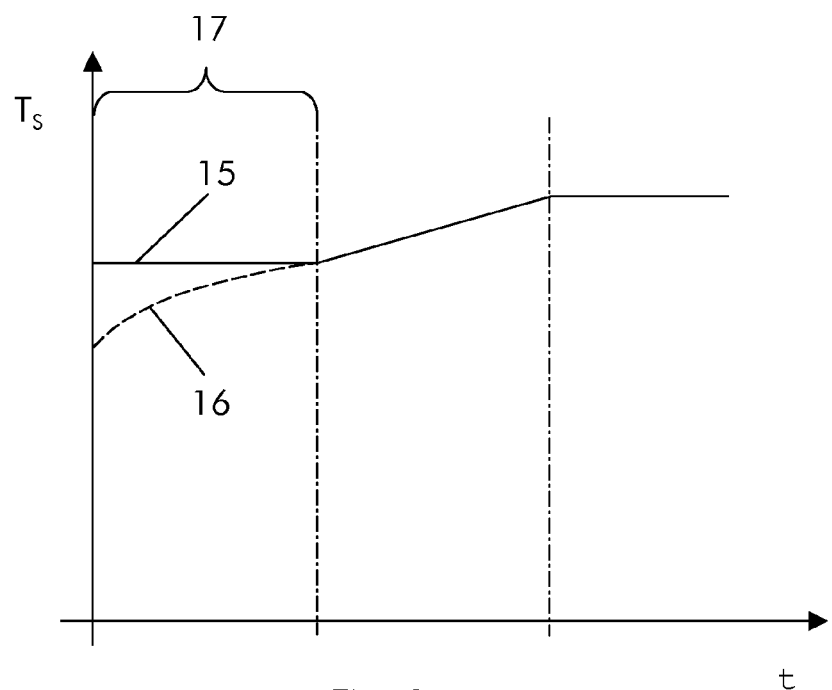
FIG. 2 is a diagram showing the run of the steam temperature ($T_s$) supplied to the steam turbine (i.e., upstream of a control valve) during a traditional start up (t indicates the time)
Figure 3:
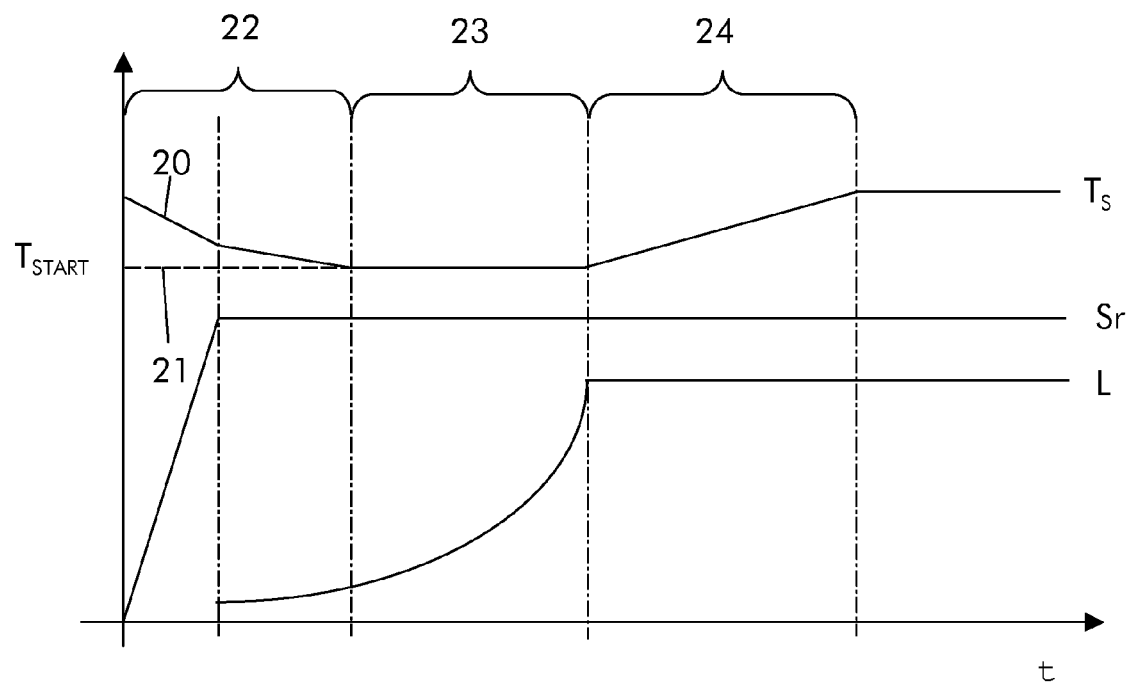
FIG. 3 is a diagram showing the run of the steam temperature ($T_s$), the steam turbine rotor speed ($S_r$), and the steam turbine load (L) during a start up in an embodiment of the invention.

Methods embodying principles of the present invention can be implemented in a traditional combined power plant, therefore in the following reference to the power plant 1 of FIG. 1 is made. In addition, reference to FIG. 3 in made; this figure shows in solid line the run of the steam temperature $T_s$ at the position $P_1$ identified by reference 20 and in dashed line the run of the steam temperature $T_s$ at the position $P_2$ identified by reference 21; the steam turbine rotor speed $S_r$, the load L; t indicates the time from initial steam admission, i.e., from when opening of the control valve 7 starts.

An exemplary method for starting the combined cycle power plant 1 includes loading the gas turbine unit 2, preferably at its maximum rate.

A starting temperature $T_{start}$ for the steam supplied to the steam turbine 5 is thus provided; typically this starting temperature can be a prefixed or given temperature.

When the gas turbine unit 2 is loaded, the control valve 7 is regulated from a closed position to an open position to admit steam into the steam turbine 5.

During this initial admission (i.e., while the control valve 7 is regulated, time interval 22) the temperature $T_s$ of the steam generated within the heat recovery steam generator 4 and supplied to the steam turbine 5 is controlled at a temperature higher than the starting temperature $T_{start}$ at the position $P_1$ upstream of the control valve 7 (solid line 20), and at a temperature substantially equal to the starting temperature $T_{start}$ at the position $P_2$ downstream of the control valve 7 and upstream of the rotor 8 (dashed line 21).

In particular, the steam temperature at the position $P_2$ is regulated by regulating the steam temperature upstream of the control valve 7 in accordance with the temperature drop caused by the control valve 7 when the steam passes through it.

Typically such a regulation is carried out within the attemperators 10.

In other words, the steam temperature $T_s$ is controlled such that the temperature drop to which the steam is subjected when passing through the control valve 7 brings the steam to the temperature $T_{start}$.

Then, when the control valve 7 is substantially fully open (therefore no steam cooling for Joule-Thompson effect occurs anymore, time interval 23), steam is supplied to the steam turbine 5 at the starting temperature $T_{start}$. According to the particular needs and cycle configuration, the steam turbine 5 can thus be further loaded or not (i.e. it can keep the load reached).

During this phase and the following phases the steam temperature at the positions $P_1$ and $P_2$ is substantially the same (because no cooling for Joule-Thompson effect within the control valve 7 occurs and heat exchange between the steam and control valve 7 is typically low).

After the steam turbine 5 has been loaded, the steam temperature is increased up to its nominal value (time interval 24).

Figure 5:
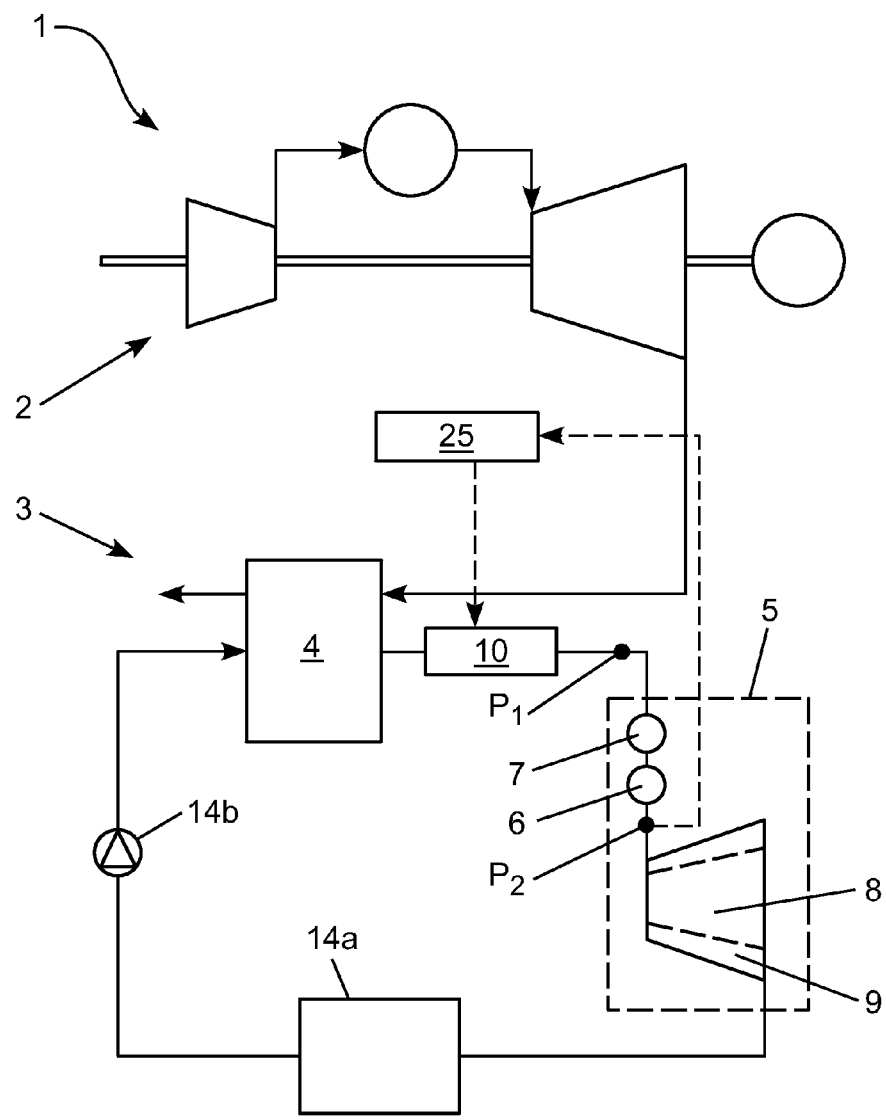
FIG. 5 is a schematic view of a combined cycle plant according to an exemplary embodiment of the present disclosure.

As shown in FIG. 5, in order to regulate the temperature at the position $P^2$, the temperature at the same position $P_2$ is either:
 calculated on the basis of the temperature and pressure at the position $P_1$ and the pressure at the position $P_2$, or
 directly measured.

The temperature at the position $P_2$ is thus supplied to a control unit 25 that regulates the attemperators 10 and/or gas turbine 2 accordingly.

Figure 4:
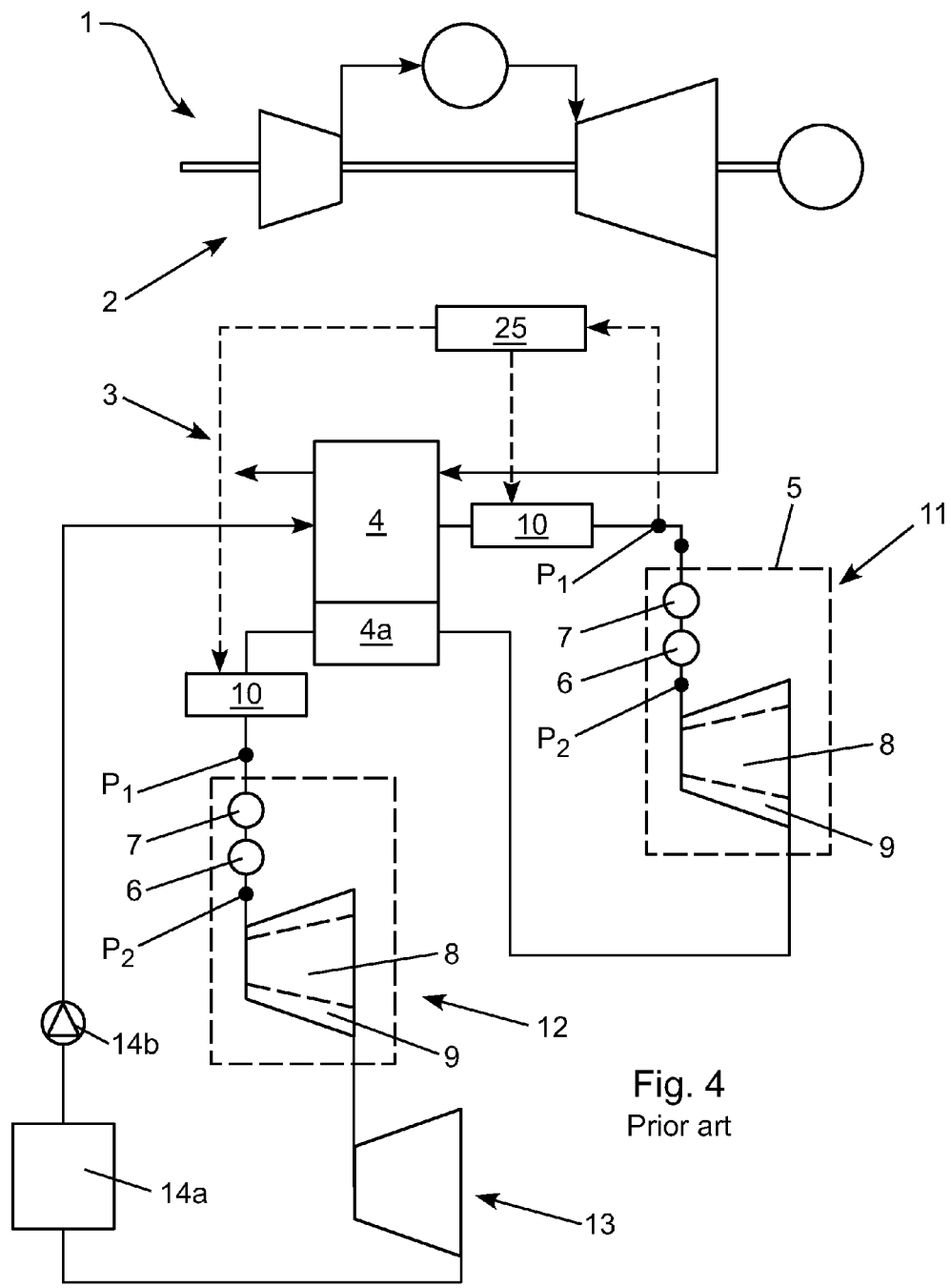
FIG. 4 is a schematic view of a combined cycle plant according to a known implementation in which the high pressure turbine, the medium pressure turbine, and the low pressure turbine are shown.

FIG. 4 shows an embodiment of a combined cycle plant 1 in which the gas turbine unit 2 and the steam turbine unit 3 are shown. In particular for the steam turbine unit 3 there are shown:
 the heat recovering steam generator (HRSG) 4 with attemperators 10 within them and/or between the same heat recovery steam generator 4 and a high pressure steam turbine 11;
 the high pressure steam turbine identified by reference 11;
 a reheat boiler 4a with attemperators 10 within them and/or between the same reheat boiler 4a and a medium pressure steam turbine 12;
 the medium pressure steam turbine identified by reference 12;
 a low pressure steam turbine identified by reference 13.

Additionally, references 14a, 14b respectively indicate a condenser and a pump.

As shown, both the high pressure steam turbine 11 and the medium pressure steam turbine 12 are provided with the stop valve 6 and control valve 7 and the method can be implemented with reference to each of these turbines (i.e., high pressure steam turbine 11 and/or medium pressure steam turbine 12); thus the method can be implemented in all high temperature sections. Naturally also different embodiments are possible and also the low pressure steam turbine 13 can be provided with stop valve 6 and control valve 7 and thus the method could also be implemented with reference to the low pressure turbine 13. In other words, the method can be implemented with respect to the high pressure steam turbine 11 and/or medium pressure steam turbine 12 and/or low pressure steam turbine 13.

Figure 6:
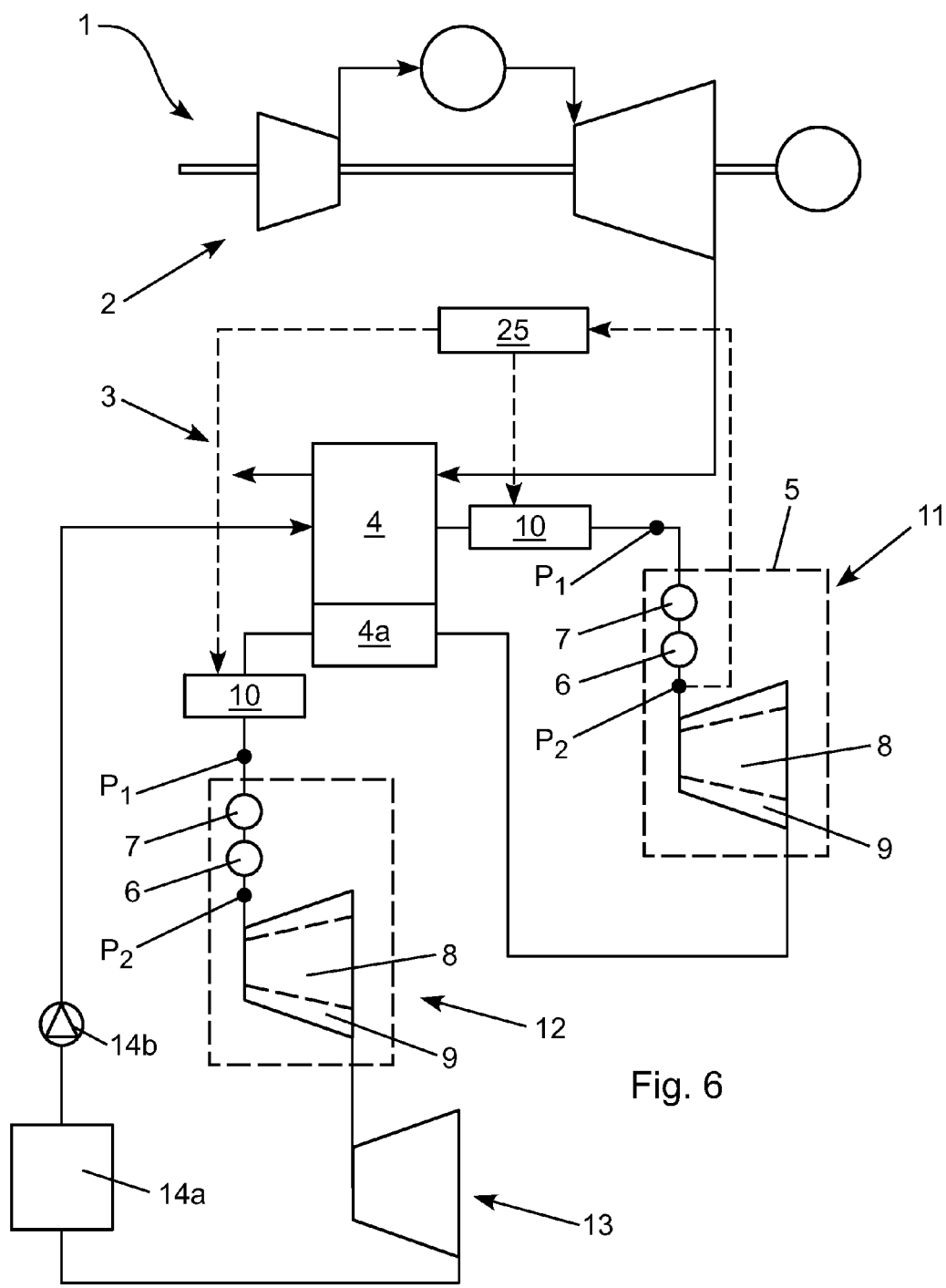
FIG. 6 is a schematic view of a combined cycle plant having a high pressure turbine, the medium pressure turbine, and the low pressure turbine according to an exemplary embodiment of the present disclosure.

Advantageously, and as shown in FIG. 6, the method in embodiments of the invention permit maintaining the steam temperature $T_s$ at the position (i.e., directly upstream of the rotor 8) constant over the whole start up, i.e., from initial steam admission until the steam turbine 5 is loaded.

This allows the life consumption of the rotor due to thermal stress during each start up to be reduced (for a given start up time).

Naturally the features described may be independently provided from one another.

In practice the materials used and the dimensions can be chosen at will according to requirements and to the state of the art.

REFERENCE NUMBERS 1 combined cycle power plant
2 gas turbine unit
3 steam turbine unit
4 heat recovery steam generator (HRSG)
4a reheat boiler
5 steam turbine
6 stop valve
7 control valve
8 rotor
9 guide vanes
10 attemperators
11 high pressure steam turbine
12 medium pressure steam turbine
13 low pressure steam turbine
14a condenser
14b pump
15 steam temperature in $P_1$
16 steam temperature in $P_2$
17 time interval
20 steam temperature in $P_1$
21 steam temperature in $P_2$
22 time interval
23 time interval
24 time interval
$P_1$ position upstream of the steam turbine 5
$P_2$ position downstream of the control valve 7 and upstream of the rotor 8
$T_s$ steam temperature
$T_{start}$ prefixed temperature L load
S_r rotor speed
t time While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for starting a combined cycle power plant having a gas turbine unit and a steam turbine unit, the steam turbine unit having a steam turbine with a rotor and a control valve upstream of the rotor, the method comprising:
    loading the gas turbine unit;
    determining a starting temperature ($T_{start}$) for the steam supplied to the steam turbine;
    regulating the control valve from a closed position to an open position to admit steam into the steam turbine;
    controlling, via a control unit, the temperature of the steam during said regulating to a temperature higher than the starting temperature ($T_{start}$) at a position ($P_1$) upstream of the control valve, and a temperature substantially equal to the starting temperature ($T_{start}$) at a position ($P_2$) downstream of the control valve and upstream of the rotor; and
    regulating, via the control unit, a steam attemperator based on at least the steam temperature at the position downstream of the control valve and upstream of the rotor.

2. A method according to claim 1, wherein controlling comprises controlling the temperature of the steam so that when the control valve is substantially fully open, steam is supplied to the steam turbine at the starting temperature ($T_{start}$).

3. A method according to claim 2, comprising:
    additionally loading the steam turbine while supplying steam to the steam turbine at the starting temperature ($T_{start}$).

4. A method according to claim 1, wherein controlling comprises controlling the steam temperature upstream of the control valve based on a temperature drop caused by the control valve as steam passes through it.

5. A method according to claim 1, further comprising:
    either calculating the temperature of steam at the position ($P_2$) downstream of the control valve based on the temperature and pressure of steam at the position ($P_1$) upstream of the control valve and the pressure of steam at the position ($P_2$) downstream of the control valve, or directly measuring the temperature of steam at the position ($P_2$); and wherein controlling comprises controlling the temperature of steam at the position ($P_2$) downstream of the control valve based on said calculating or said directly measuring.

6. A method according to claim 5, wherein the combined cycle power plant includes an attemperator upstream of the steam turbine and a control unit configured and arranged to regulate the attemperator, the gas turbine, or both, and further comprising:
    supplying the steam temperature at the position ($P_2$) downstream of the control valve to the control unit; and
    regulating the attemperator, the gas turbine, or both, based on said steam temperature at the position ($P_2$) downstream of the control valve.

7. A method according to claim 1, wherein loading the gas turbine unit comprises loading at a maximum rate of the gas turbine unit.

8. A method according to claim 1, further comprising:
    increasing the steam temperature up to a nominal value after said loading of the steam turbine unit.

* * * * *